United States Patent
Mathieson, III et al.

(10) Patent No.: US 11,431,743 B2
(45) Date of Patent: Aug. 30, 2022

(54) CROSS DOMAIN DYNAMIC DATA PROTECTION INTERMEDIARY MESSAGE TRANSFORM PLATFORM

(71) Applicant: Forcepoint, LLC, Austin, TX (US)

(72) Inventors: Robert A. Mathieson, III, Stafford, VA (US); Alexander Todd Dierkes, Missouri City, TX (US)

(73) Assignee: Forcepoint, LLC, Austin, TX (US)

( * ) Notice: Subject to any disclaimer, the term of this patent is extended or adjusted under 35 U.S.C. 154(b) by 200 days.

(21) Appl. No.: 16/780,348

(22) Filed: Feb. 3, 2020

(65) Prior Publication Data
US 2021/0243211 A1    Aug. 5, 2021

(51) Int. Cl.
*H04L 9/40*     (2022.01)
*H04L 9/32*     (2006.01)

(52) U.S. Cl.
CPC ........ *H04L 63/1425* (2013.01); *H04L 9/3263* (2013.01)

(58) Field of Classification Search
CPC ............... H04L 9/3263; H04L 63/1425; H04L 63/1416; H04L 63/10; H04L 41/16; G06N 20/00; G06F 16/285
See application file for complete search history.

(56) References Cited

U.S. PATENT DOCUMENTS

| | | |
|---|---|---|
| 7,249,369 B2 | 7/2007 | Knouse et al. |
| 7,558,775 B1 | 7/2009 | Panigrahy et al. |
| 7,916,702 B2 | 3/2011 | Hirano et al. |
| 7,941,484 B2 | 5/2011 | Chandler et al. |
| 7,965,830 B2 | 6/2011 | Fleck et al. |
| 8,060,904 B1 | 11/2011 | Evans et al. |
| 8,341,734 B1 | 12/2012 | Hernacki et al. |
| 8,347,392 B2 | 1/2013 | Chess et al. |
| 8,432,914 B2 | 4/2013 | Zinjuwadia et al. |
| 8,463,612 B1 | 6/2013 | Neath et al. |
| 8,572,758 B1 * | 10/2013 | Clifford .............. G06F 21/6218 726/30 |
| 8,695,090 B2 | 4/2014 | Barile et al. |
| 8,856,869 B1 | 10/2014 | Brinskelle |
| 8,990,882 B1 * | 3/2015 | Koshy ..................... G06F 21/60 726/1 |

(Continued)

OTHER PUBLICATIONS

Sharma et al., "Managed data loss prevention security service in cloud," 3rd International Conference on Electrical, Electronics, Engineering Trends, Communication, Optimization and Sciences (EEECOS 2016) Year: 2016 | Conference Paper | Publisher: IET.*

(Continued)

*Primary Examiner* — Roderick Tolentino
(74) *Attorney, Agent, or Firm* — Terrile, Cannatti & Chambers, LLP; Emmanuel A. Rivera

(57) ABSTRACT

A method, system and computer-usable medium for routing data loss prevention (DLP) events across different network levels. A determination is made as to a number of DLP networks. The classification and data as to a DLP network is determined. Certain data is processed, including an entity risk level and certain data is held, such as certificates. The held data is processed by a computing platform. Processed entity risk levels are returned to the DLP networks. When all networks are processed, processed and held data are sent to the computing platform.

20 Claims, 6 Drawing Sheets

(56) References Cited

U.S. PATENT DOCUMENTS

| | | | |
|---|---|---|---|
| 9,146,953 B1 | 9/2015 | Hernacki et al. | |
| 9,183,258 B1 | 11/2015 | Taylor et al. | |
| 9,197,601 B2 | 11/2015 | Pasdar | |
| 9,208,316 B1 | 12/2015 | Hill et al. | |
| 9,208,450 B1 | 12/2015 | Nanda et al. | |
| 9,219,752 B2 | 12/2015 | Balinsky et al. | |
| 9,349,016 B1* | 5/2016 | Brisebois | H04L 63/20 |
| 9,363,164 B2 | 6/2016 | Lemieux | |
| 9,367,872 B1 | 6/2016 | Visbal et al. | |
| 9,374,228 B2 | 6/2016 | Pendarakis et al. | |
| 9,380,523 B1 | 6/2016 | Mijar et al. | |
| 9,419,855 B2 | 8/2016 | Ganichev et al. | |
| 9,465,668 B1 | 10/2016 | Roskind et al. | |
| 9,491,183 B1 | 11/2016 | Dippenaar | |
| 9,525,838 B2 | 12/2016 | Thiyagarajan | |
| 9,826,023 B2 | 11/2017 | Yu | |
| 9,847,910 B2 | 12/2017 | Chung | |
| 10,057,157 B2 | 8/2018 | Goliya et al. | |
| 10,063,419 B2 | 8/2018 | Horstmann et al. | |
| 10,122,632 B2 | 11/2018 | Trossen et al. | |
| 10,142,353 B2 | 11/2018 | Yadav et al. | |
| 10,142,427 B2 | 11/2018 | Li et al. | |
| 10,176,341 B2 | 1/2019 | Spaulding et al. | |
| 10,187,485 B1 | 1/2019 | Shavell et al. | |
| 10,192,074 B2 | 1/2019 | Sarin et al. | |
| 10,205,663 B1 | 2/2019 | Jones et al. | |
| 10,237,175 B2 | 3/2019 | Pignataro et al. | |
| 10,255,445 B1 | 4/2019 | Brinskelle | |
| 10,270,878 B1 | 4/2019 | Uppal et al. | |
| 10,284,578 B2 | 5/2019 | Brugger et al. | |
| 10,284,595 B2 | 5/2019 | Reddy et al. | |
| 10,289,857 B1 | 5/2019 | Brinskelle | |
| 10,291,417 B2 | 5/2019 | Vucina et al. | |
| 10,296,558 B1 | 5/2019 | McInerny | |
| 10,305,776 B2 | 5/2019 | Horn et al. | |
| 10,313,386 B1* | 6/2019 | Roturier | H04L 63/107 |
| 10,326,735 B2 | 6/2019 | Jakobsson et al. | |
| 10,331,769 B1 | 6/2019 | Hill et al. | |
| 10,348,639 B2 | 7/2019 | Puchala et al. | |
| 10,349,304 B2 | 7/2019 | Kim et al. | |
| 10,355,973 B2 | 7/2019 | Cicic et al. | |
| 10,439,926 B2 | 10/2019 | Horn et al. | |
| 10,440,503 B2 | 10/2019 | Tapia | |
| 10,498,693 B1 | 12/2019 | Strauss et al. | |
| 10,530,697 B2 | 1/2020 | Fourie et al. | |
| 10,547,633 B1* | 1/2020 | Dell'Amico | H04L 41/024 |
| 10,599,462 B2 | 3/2020 | Fried-Gintis | |
| 10,601,787 B2 | 3/2020 | Pritikin et al. | |
| 10,635,512 B2 | 4/2020 | Pepin et al. | |
| 10,652,047 B2 | 5/2020 | Jain et al. | |
| 10,708,125 B1 | 7/2020 | Chen | |
| 2002/0120599 A1 | 8/2002 | Knouse et al. | |
| 2003/0169724 A1 | 9/2003 | Mehta et al. | |
| 2004/0146006 A1 | 7/2004 | Jackson | |
| 2005/0027782 A1 | 2/2005 | Jalan et al. | |
| 2005/0102266 A1 | 5/2005 | Nason et al. | |
| 2005/0105608 A1 | 5/2005 | Coleman et al. | |
| 2005/0207405 A1 | 9/2005 | Dowling | |
| 2005/0273850 A1 | 12/2005 | Freund | |
| 2006/0018466 A1 | 1/2006 | Adelstein et al. | |
| 2006/0221967 A1 | 10/2006 | Narayan et al. | |
| 2008/0320556 A1 | 12/2008 | Lee et al. | |
| 2009/0175211 A1 | 7/2009 | Jakobsen | |
| 2009/0241197 A1 | 9/2009 | Troyansky | |
| 2009/0296685 A1 | 12/2009 | O'Shea et al. | |
| 2009/0307600 A1 | 12/2009 | Arthur et al. | |
| 2011/0169844 A1 | 7/2011 | Diard et al. | |
| 2012/0324365 A1 | 12/2012 | Momchilov et al. | |
| 2013/0034097 A1 | 2/2013 | Dharmapurikar et al. | |
| 2013/0091214 A1 | 4/2013 | Kellerman et al. | |
| 2013/0120411 A1 | 5/2013 | Swift et al. | |
| 2013/0340029 A1 | 12/2013 | De Armas et al. | |
| 2014/0032759 A1 | 1/2014 | Barton et al. | |
| 2014/0082726 A1 | 3/2014 | Dreller et al. | |
| 2014/0109174 A1 | 4/2014 | Barton et al. | |
| 2014/0146062 A1 | 5/2014 | Kiel et al. | |
| 2014/0165137 A1 | 6/2014 | Balinsky et al. | |
| 2014/0207850 A1 | 7/2014 | Bestler et al. | |
| 2014/0237594 A1 | 8/2014 | Thakadu et al. | |
| 2014/0280517 A1 | 9/2014 | White et al. | |
| 2014/0379812 A1 | 12/2014 | Bastide, II et al. | |
| 2015/0067832 A1 | 3/2015 | Sastry | |
| 2015/0134730 A1 | 5/2015 | Seedorf et al. | |
| 2015/0220707 A1 | 8/2015 | Kline et al. | |
| 2015/0261940 A1* | 9/2015 | Roundy | H04L 67/1097 726/26 |
| 2015/0264035 A1 | 9/2015 | Waterhouse et al. | |
| 2015/0264049 A1 | 9/2015 | Achilles et al. | |
| 2015/0288714 A1 | 10/2015 | Emigh et al. | |
| 2015/0381641 A1 | 12/2015 | Cabrera et al. | |
| 2016/0080397 A1 | 3/2016 | Bacastow et al. | |
| 2016/0094645 A1 | 3/2016 | Ashutosh et al. | |
| 2016/0103992 A1 | 4/2016 | Roundy et al. | |
| 2016/0212012 A1 | 7/2016 | Young et al. | |
| 2016/0352719 A1 | 12/2016 | Yu | |
| 2016/0378409 A1 | 12/2016 | Muramatsu | |
| 2017/0061345 A1 | 3/2017 | Jones, III et al. | |
| 2017/0126587 A1 | 5/2017 | Ranns et al. | |
| 2017/0126718 A1 | 5/2017 | Baradaran et al. | |
| 2017/0134506 A1 | 5/2017 | Rotem et al. | |
| 2017/0237779 A1 | 8/2017 | Seetharaman et al. | |
| 2017/0264628 A1 | 9/2017 | Treat et al. | |
| 2017/0302665 A1 | 10/2017 | Zou et al. | |
| 2017/0339178 A1* | 11/2017 | Mahaffey | H04L 41/142 |
| 2018/0012144 A1 | 1/2018 | Ding et al. | |
| 2018/0115613 A1 | 4/2018 | Vajravel et al. | |
| 2018/0152471 A1 | 5/2018 | Jakobsson | |
| 2018/0165463 A1 | 6/2018 | McCreary et al. | |
| 2018/0173453 A1 | 6/2018 | Danilov et al. | |
| 2018/0234368 A1 | 8/2018 | Everton | |
| 2018/0330257 A1 | 11/2018 | Dodson et al. | |
| 2018/0375760 A1 | 12/2018 | Saavedra | |
| 2019/0037029 A1 | 1/2019 | Border | |
| 2019/0057200 A1 | 2/2019 | Sabag et al. | |
| 2019/0075124 A1 | 3/2019 | Kimhi et al. | |
| 2019/0081981 A1* | 3/2019 | Bansal | H04L 63/1433 |
| 2019/0182213 A1 | 6/2019 | Saavedra et al. | |
| 2019/0199745 A1 | 6/2019 | Jakobsson et al. | |
| 2019/0230090 A1 | 7/2019 | Kathiara et al. | |
| 2019/0268381 A1 | 8/2019 | Narayanaswamy et al. | |
| 2019/0278760 A1 | 9/2019 | Smart | |
| 2019/0342313 A1 | 11/2019 | Watkiss et al. | |
| 2019/0354709 A1 | 11/2019 | Brinskelle | |
| 2019/0378102 A1 | 12/2019 | Kohli | |
| 2020/0007548 A1 | 1/2020 | Sanghavi et al. | |
| 2020/0021515 A1 | 1/2020 | Michael et al. | |
| 2020/0021684 A1 | 1/2020 | Kreet et al. | |
| 2020/0153719 A1 | 5/2020 | Chauhan | |
| 2020/0195517 A1* | 6/2020 | Manthena | H04L 41/5041 |
| 2020/0196092 A1 | 6/2020 | Jones | |
| 2020/0213336 A1 | 7/2020 | Yu et al. | |
| 2020/0279139 A1* | 9/2020 | Collins | G06F 21/6218 |
| 2020/0314002 A1 | 10/2020 | Benoist et al. | |
| 2020/0314004 A1 | 10/2020 | Rashad et al. | |

OTHER PUBLICATIONS

Bowo et al., "Data Quality Assessment: A Case Study of PT JAS Using TDQM Framework," 2019 Fourth International Conference on Informatics and Computing (ICIC) Year: 2019 | Conference Paper | Publisher: IEEE.*

Github.com, Gnome Mutter desktop manager, https://github.com/GNOME/mutter, downloaded Feb. 1, 2019.

Github.com, SimpleScreenRecorder, https://github.com/MaartenBaert/ssr, downloaded Feb. 1, 2019.

Zscaler, About Virtual ZENs, downloaded Apr. 4, 2019.

Papadopoulos et al., An error control scheme for large-scale multicast applications, Proceedings, IEEE INFOCOM '98, the Conference on Computer Communications; Mar. 29-Apr. 2, 1998.

Schmidt et al., AuthoCast: a protocol for mobile multicast sender authentication, Proceeding, MoMM '08 Proceedings of the 6th International Conference on Advanced in Mobile Computing and Multimedia, pp. 142-149, 2008.

(56) References Cited

OTHER PUBLICATIONS

Splunk, Adaptive Operations Framework, printed Jan. 29, 2020 https://www.splunk.com/en_us/solutions/solution-areas/security-and-fraud/adaptive-response-initiative.html.
Check Point Software Technologies Ltd., Firewall and SmartDefense, Version NGX R62, 702048, Sep. 25, 2006.
Check Point Software Technologies Ltd., Softwareblades, Firewall R75.40, Administration Guide, Nov. 30, 2014.
Fortinet, FortiOS Handbook—Firewall, version 5.2.0, May 5, 2017.
Wikipedia, IP Address Spoofing, printed Aug. 16, 2017.
David Davis, Techrepublic, Prevent IP Spoofing with the Cisco IOS, Mar. 14, 2007.
Evostream.com, Media Server and Video Streaming Software, https://evostream.com/#, printed Feb. 22, 2018.
Wowza.com, Wowza Streaming Engine, https://www.wowza.com/products/streaming-engine, printed Feb. 22, 2018.
Opencv.org, https://opencv.org/, printed Mar. 6, 2018.
Stackoverflow.com, OpenCV Crop Live Feed from Camera, https://stackoverflow.com/questions/17352420/opencv-crop-live-feed-from-camera, printed Feb. 22, 2018.
Baker F., "Requirements for IP Version 4 Routers," RFC 1812, Jun. 1995. (Year: 1995).
Nichols et al., "Definition of the Differentiated Services Field (DS field) in the IPv4 and IPv6 Headers," RFC 2474, Dec. 1998. (Year: 1998).
Fuller et al., "Classless Inter-Domain Routing (CIDR): The Internet Address Assignment and Aggregation Plan," RFC 4632, Aug. 2006. (Year: 2006).
Hinden, R., "Applicability Statement for the Implementation of Classless Inter-Domain Routing (CIDR)," RFC 1517, Internet Engineering Steering Group, Sep. 1993. (Year: 1993).
Grossman, D., "New Terminology and Clarifications for Diffserv," RFC 3260, Apr. 2002. (Year: 2002).
Arkko J. et al., "IPv4 Address Blocks Reserved for Documentation," RFC 5737, Jan. 2010. (Year: 2010).
Dotton, M. et al., "Special Purpose IP Address Registries," RFC 6890, Apr. 2013. (Year: 2013).
Housley, R. et al., "The Internet Numbers Registry System," RFC 7020, Aug. 2013. (Year: 2013).
Mybluelinux.com, What is email envelope and email header, downloaded Jan. 16, 2020.
Gugelmann, David et al. "Can content-based data loss prevention solutions prevent data leakage in Web traffic?" IEEE Security & Privacy 13.4 (2015): 52-59, (Year: 2015).
Yoshihama, Sachiko et al., "Web-Based Data Leakage Prevention," IWSEC (Short Papers), 2010 (Year: 2010).

\* cited by examiner

CROSS DOMAIN DYNAMIC DATA PROTECTION INTERMEDIARY MESSAGE TRANSFORM PLATFORM

BACKGROUND OF THE INVENTION

Field of the Invention

The present invention relates in general to the field of computers and similar technologies, and in particular to software utilized in this field. Still more particularly, the present invention relates to a method, system and computer-usable medium for routing data loss prevention (DLP) events across different network levels.

Description of the Related Art

Users interact with physical, system, data, and services resources of all kinds, as well as each other, on a daily basis. Each of these interactions, whether accidental or intended, pose some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

Computer platforms can be implemented to provide data protection, and monitor user activities that represent user behaviors to address security risks. User activities are in the form of information or data, such as messages. In certain implementations, these messages are passed from different networks, where the networks have varying classification levels, such as from high to low or classified levels. Computer platforms that rely on command signals, may not be able support (i.e., supply command signals) from a high network classification level down to a low or unclassified network level. If such a computer platform relies on command signals and operates between different network classification, mechanisms are needed to affect any changes from output of the computer platform. Costly solutions can include implementing multiple computer platform solutions operating between different classification of networks.

In certain instances, the information or data, such as messages are contained in destination and source files. Certain methods monitor activity, but do not provide an ability to pair destination and source files or gather information about such files. Certain methods can be inconvenient and require user intervention, such as opening a window, identifying, and dropping and dragging files.

SUMMARY OF THE INVENTION

A method, system and computer-usable medium for routing data loss prevention (DLP) events across different network levels. A determination is made as to a number of DLP networks. The classification and data as to a DLP network is determined. Certain data is processed, including an entity risk level and certain data is held, such as certificates. The held data is processed by a computing platform. Processed entity risk levels are returned to the DLP networks. When all networks are processed, processed and held data are sent to the computing platform.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
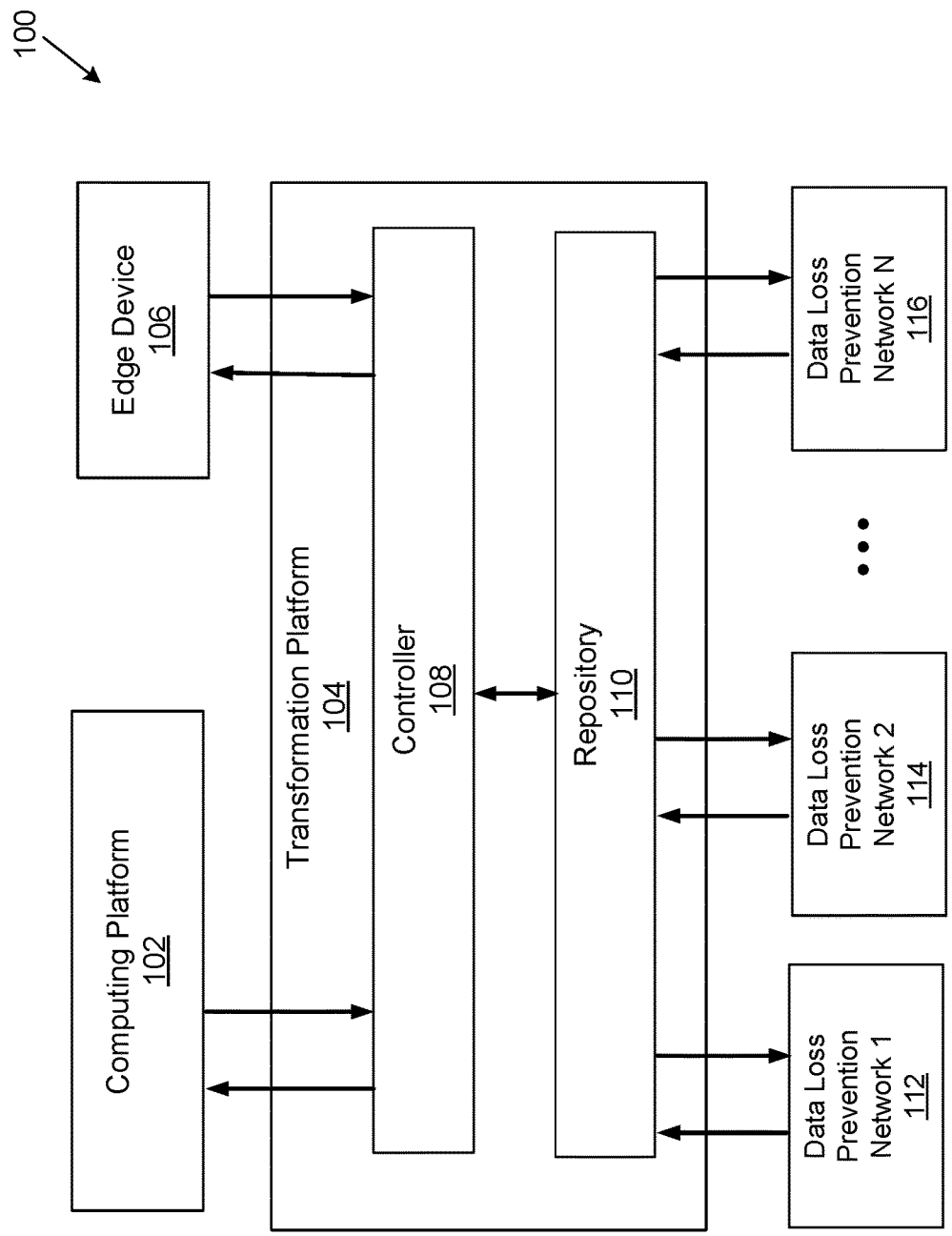
FIG. 1 depicts a system for routing data loss prevention (DLP) events across different network levels.

A method, system and computer-usable medium are disclosed for routing data loss prevention (DLP) events across different networks. A transformation platform receives from the different networks, DLP events or data and information, such as messages, and processes and classifies the data and messages for use by a computing platform, such as a dynamic data protection (DDP) computing platform, functional behavior assessment computing platform, etc. The transformation platform is a message transfer platform that can include specific filters, rules, transformation routines, in the form of specific processors, and implemented at different network classification levels.

In certain implementations, the described provides for decoupling control and repository processes from the computing platform and integrating the decoupling control and repository processes in a transformation platform, where such processes support and identify specific target behavior, purpose of the behavior (i.e., behavioral analytics), and routes data loss prevention (DLP) events from low level network classification to higher levels of classification. In certain implementations, an edge device, such as a high speed guard provides for the routing. Therefore, command signals for dynamic data protection (DDP) are routed back from the highest level of network classification down to the lowest level of network classification and supporting a single instance of functional behavior assessment (FBA).

For the purposes of this disclosure, a computing device or an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes.

For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a system for routing data loss prevention (DLP) events across different network levels. The system 100 includes a computing platform 102. As further described below, for certain implementations, the computing platform 102 is an information handling system. In certain implementations, the computing platform 102 is cloud based or a virtual machine. In certain embodiments, the computing platform 102 is a dynamic data protection (DDP), functional behavior assessment (FBA) platform, etc. In particular, the computing platform 102 supports unified access management (UAM) that provides an identity management solution. UAM is used by enterprises to manage digital identities and provide secure access to users across multiple devices and applications (e.g., cloud and on-premise based devices and applications). UAM solutions provide a single platform from which information technology and other support entities manage access across a diverse set of users, devices, and applications. In certain implementations, data loss prevention (DLP) and functional behavior assessment (FBA) are part of UAM solutions, where DLP is a strategy that assures end users do not send sensitive or critical information outside a particular network (e.g., corporate network). DLP is also related to applications that assist in controlling what data can be transferred by end users.

In at least one embodiment, the system 100 includes a transformation platform 104, considered as a message transfer platform that is an intermediary for cross domain dynamic data protection (DDP). As further described below, the transformation platform 104 is an information handling system. In certain implementations, the transformation platform 104 is cloud based or a virtual machine. In certain implementations, the transformation platform 104 supports UAM, and provides for functional behavior assessment (FBA) identifying specific target behavior and purpose of the behavior, supporting the computing platform 102 to provide DDP and FBA functionality. The transformation platform 104 further allows for DDP command signals to be routed back from the highest level of network classification down to the lowest, in an auditable manner (e.g., at each network classification), enabling analytical response actions across all levels of network classification from a single instance of FBA.

In certain implementations, the system 100 includes edge device(s) 106 that route data loss prevention events from low to high level network classifications. In certain implementations, the transformation platform 104 is part of an edge device 106, although edge device(s) 106 are not part of the transformation platform 104 and do not perform any transformation processes. Edge device(s) 106 receive and send data between networks, the transformation platform 104 and computing platform 102.

Examples of edge device(s) 106 may include high speed guards, firewalls, routers, routing switches, integrated access devices (IADs), multiplexers, wide-area network (WAN) access devices, and network security appliances. Skilled practitioners of the art will be aware that edge devices are often implemented as routers that provide authenticated access to faster, more efficient backbone and core networks. Furthermore, current industry trends include making edge devices more intelligent, which allows core devices to operate at higher speed as they are not burdened with additional administrative overhead. Accordingly, such edge devices often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices to have redundant links to the core network, which not only provides improved reliability, but enables enhanced, flexible, and scalable security capabilities as well.

In at least one embodiment, the transformation platform 104 includes a controller component 108 and repository component 110. In certain embodiments, the controller component 108 is implemented as Apache NiFi, and the repository component 110 as Apache Kafka. In particular, transformation platform 104 acts a data broker and in specific, the controller component 108 and repository component 110 are configured to pull and push data from various networks and the computing platform 102. The transformation platform 104 is considered as a platform that allows for receiving information/data, transforming the information/data and publishing the information/data. In this regard, controller component 108 is considered as a receiver and transformer and repository component 110 is considered as a publisher.

The system 100 further includes one or more networks. In particular, the system includes "data loss prevention (DLP) network 1" 112, "data loss prevention network (DLP) 2" 114 to "data loss prevention (DLP) network N" 116. The DLP networks 112, 114 to 116 include data, information, messages, certificates (e.g., secured socket layer or SSL certificates), etc. DLP networks 112, 114 to 116 connect to the transformation platform 106.

In certain instances, DDP requires that SSL certificates are accessed from DLP networks 112, 114 to 116 and changes made as to SSL certificates as to the computing platform 102 (i.e., FBA computing platform). DLP networks 112, 114 to 116 connect to the transformation platform 104, and particular to repository component 110 and push the SSL certificates and all other data to the repository component 110. No changes are made by the repository component 110; however, controller component 108 pulls risk ratings from the computing platform 102 (i.e., FBA platform) and pushes the risk ratings to the repository component 110. The DLP networks 112, 114 to 116 can pull the risk ratings into their respective systems. Therefore, the transformation platform 106 acts an intermediary platform between other platforms (i.e., computing platform 102 and DLP networks 112, 114 to 116) and pull (receive) and push (send) data. The transformation platform 106 transfers data sets and schema, without having to alter raw data. Furthermore, accountability is provided that allows data to go where the data is needed (i.e., computing platform 102) in the desired format.

Particular repositories can be provided by the transformation platform 106 as needed, such polymorphic Linux by PolyVerse, or the custom RedOwl repository which can be utilized by an FBA computing platform 102. In certain implementations, internet protocol (IP) tables are used to limit repository component 110 subscription capabilities, when Apache Kafka is implemented, wherein the limitation is to the a particular DLP network of DLP networks 112, 114 to 116 and process of the particular controller component 108, when Apache NiFi is implemented. Other network or system security tools can be also be added to the transformation platform 104 as needed. Transformation platform 104 can further be implemented to include UAM and DLP agents.

Figure 2:
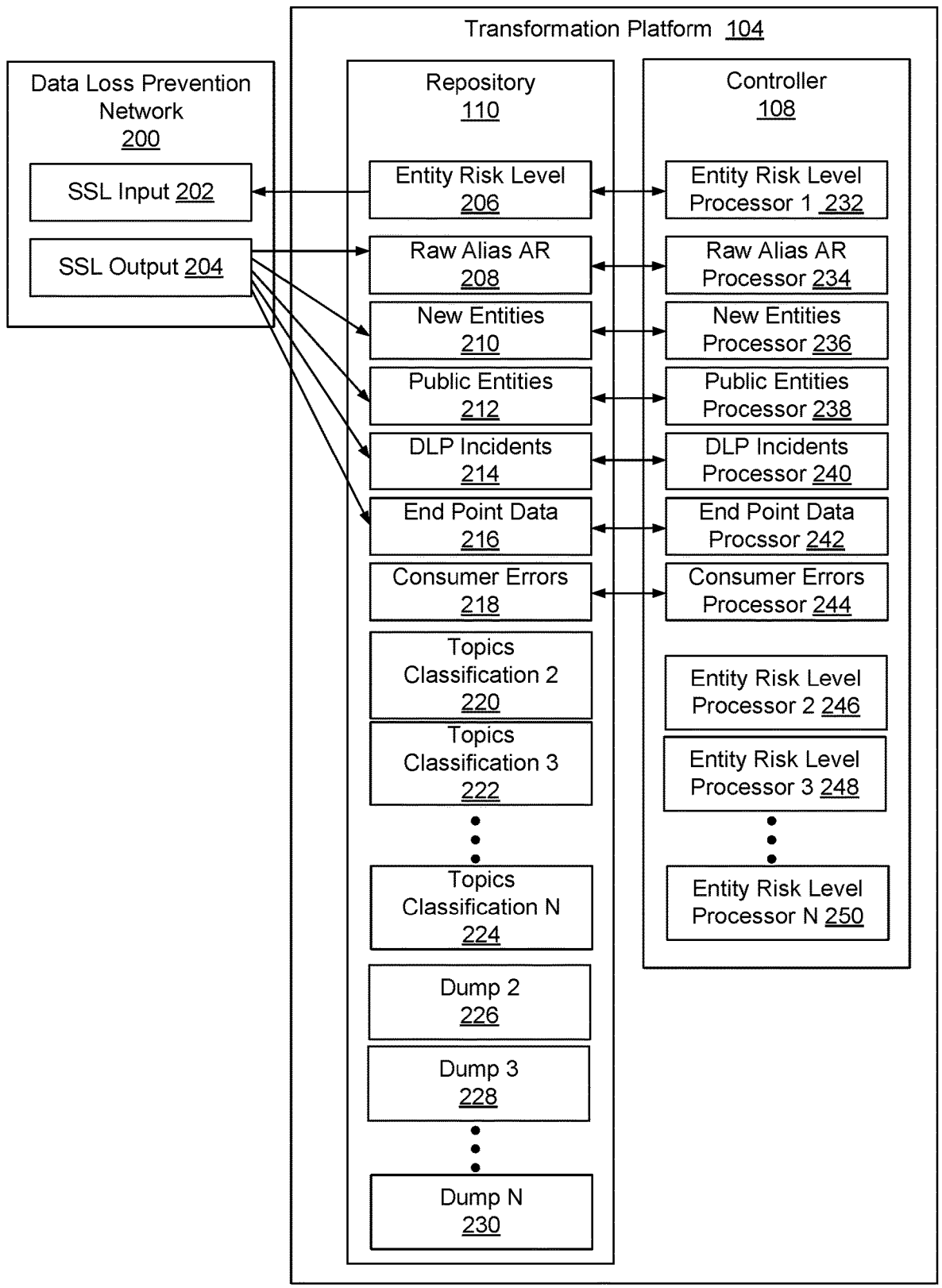
FIG. 2 depicts a transformation platform for routing data loss prevention (DLP) events across different network levels.

FIG. 2 shows a transformation platform for routing data loss prevention (DLP) events across different network levels. In particular transformation platform 104 communicates with data loss prevention (DLP) network 200. The DLP network 200 includes DLP networks 112, 114 to 116 described above. In certain implementations the DLP network 200 includes a secured sockets layer (SSL) input 202 and secured sockets layer (SSL) output 204, where communications between DLP network 200 and transformation platform 104 is through secured sockets layers (SSL). Data, information, messages, certificates, etc. are communicated through SSL input 202 and SSL output 204. Outputs from SSL output 204 include various topics.

SSL certificate sharing is performed with the DLP network 200 and transformation platform 104. Since the transformation platform 106 communicates with the computing platform 102, the need for different DLP networks to share SSL certificates with the computing platform 102 is avoided. The transformation platform 104 tracks classification of the DLP networks, such DLP network 200, and DLP networks 112, 114 to 116. In certain implementations, based on classification, the DLP networks cannot share SSL certificates. In other words, a DLP network classified at the highest classification share SSL certificates with lower classification networks.

In certain instances, DDP requires that SSL certificates from a DLP network are changed at the computing platform 102 (i.e., FBA computing platform). The transformation platform 104 provides for a DLP network to connect and push DLP data in and push the data (e.g., SSL certificates) to the computing platform 102 (i.e., FBA computing platform) without changing the data (e.g., SSL certificates).

Certificates (e.g., SSL certificates) get held by transformation platform 104 instead of swapping out certificates when adding a new network (e.g., DLP network), and still provide analytics on the system. It is not necessary to bring down existing networks (e.g., DLP network) to add certificates to new network (e.g., DLP network), and avoids downtime and assists in the integration of certificates.

In certain implementations, repository component 110 includes various topics, for example entity risk level 206, raw alias AR 208, new entities 210, public entities 212, DLP incidents 214, endpoint data 216, and consumers errors 218. In certain implementations, such topics are specific to DDP, and are particular to the computing platform 102 (e.g., FBA computing platform). It is to be understood, that other topics are possible, and are provided based on specific user needs.

In this implementation, the topics are replicated for different levels of network classification. For certain instances, underlying processes regarding repository component 110 (e.g., Apache Kafka) dictate a requirement for replication of the topics for different network classification. "Topics classification 2" 220, "topics classification 3" 222, up to "topics classification N" 224 represent replicated topics. In certain implementations, the repository component 110 includes a "data dump 2" 224 for network classification 2, a "data dump 3" 228 for network classification 3, up to a "data dump N" 230 for network classification N.

In certain implementations, processors provided in computer computing platform 102 are provided by controller component 108. Such processors correspond to topics 206 to 218. In particular, entity risk level processor 1 232 supports the topic entity risk level 206; raw alias AR processor 234 supports topic raw alias AR 208; new entities processor 236 supports topic new entities 210; public entities processor 238 supports topic public entities 212; DLP incidents processor 240 supports topic DLP incidents 214; endpoint data processor 242 supports topic endpoint data 216; and consumers errors processor 244 supports topic consumers errors 218. The controller component 108 and repository component 110 are implemented in a single transformation platform 106 to enable single machine deployment and simplify the process of network accreditation. The processors 232 to 244 are enabled to facilitate queries of the repository component 110 topics, enable initial data transformation as necessary, and forward information.

The entity risk level processor 1 232 of controller component 108 is specifically designed to segment command signals derived from the computing platform 102 (i.e., FBA computing platform) into individual risk levels associated with the network classification being serviced, forward segmented data to the appropriate repository component 110 topic, and filter out any messages that do not meet the requirements of acceptable network classification. In certain implementations, an "entity risk level processor 2" 246 is provided for network classification 2; an "entity risk level processor 3" 246 is provided for network classification 3; up to an "entity risk level processor N 250 for network classification N.

In certain implementations, in order to support security systems, security tools (e.g., Linux security tools) are used to lock down file systems and can be created in the repository component 110 and message or data validation is provided for the topics.

Figure 3:
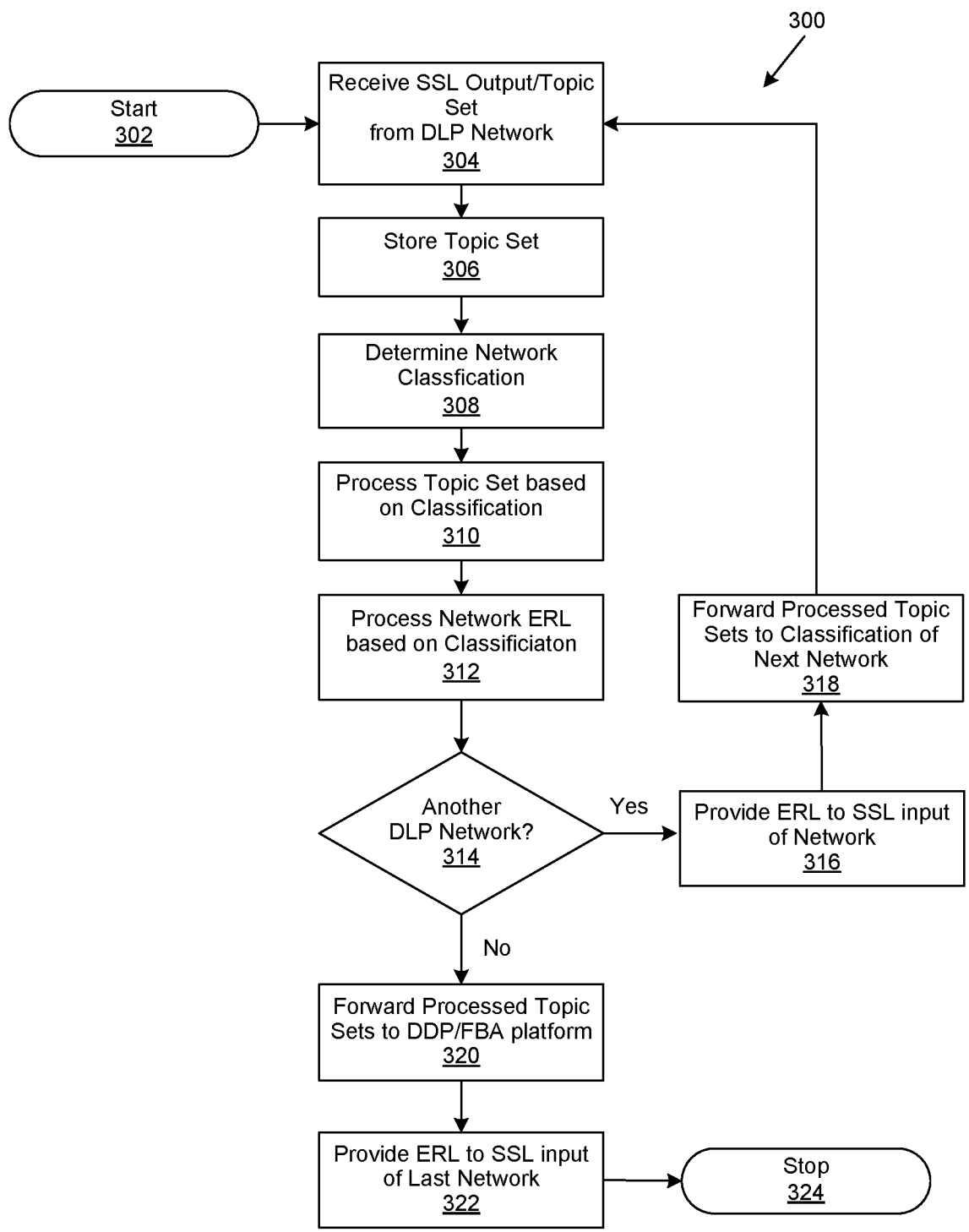
FIG. 3 is generalized flowchart for processes between a transformation platform and different networks.

FIG. 3 is generalized process flow 300 for processes between a transformation platform and different networks. The order in which the process flow is described is not intended to be construed as a limitation, and any number of the described blocks can be combined in any order to implement the process flow. Additionally, individual blocks may be deleted from the process flow without departing from the spirit and scope of the subject matter described herein. Furthermore, the process flow may be implemented in any suitable hardware, software, firmware, or a combination thereof, without departing from the scope of the invention.

At block 302, the process 300 starts. At step 304, a topic set is received by the transformation platform 104. Topic set can be received from an SSL output a DLP network as describe above. At step 306, the topic set is stored in repository component 110 of transformation platform 104. At step 308, transformation platform 104 determines classification level of the DLP network. At step 310, the specific processors of controller component 108 processes the topic set stored in repository component 110. At step 312, the entity risk level (ERL) of the network is processed based on the classification of the network. A specific network level ERL processor performs the processing. If another DLP network is to be processed, then following the "Yes" branch of block 314, at step 316, the ERL is provided to the DLP network through an SSL input of the DLP network. At step 318, the processed topic set is forwarded to the classification of the next DLP network. In certain implementations, the processed topic set goes though an edge device or devices 106, such as a high speed guard and/or firewall. In certain implementations, processing of DLP networks goes from lower classification levels to higher classification levels. If there are no other DLP networks to be processed, following the "No" branch of block 314 at step 320 all the processed topic sets are forwarded to the computing platform 102, where the computing platform can include a dynamic data protection (DDP) platform, a functional behavior assessment (FBA), etc. At step 322, the ERL of the last network to be processed is provided by a controller of the computing platform 102 as described below. At step 324, the process 300 ends.

Figure 4:
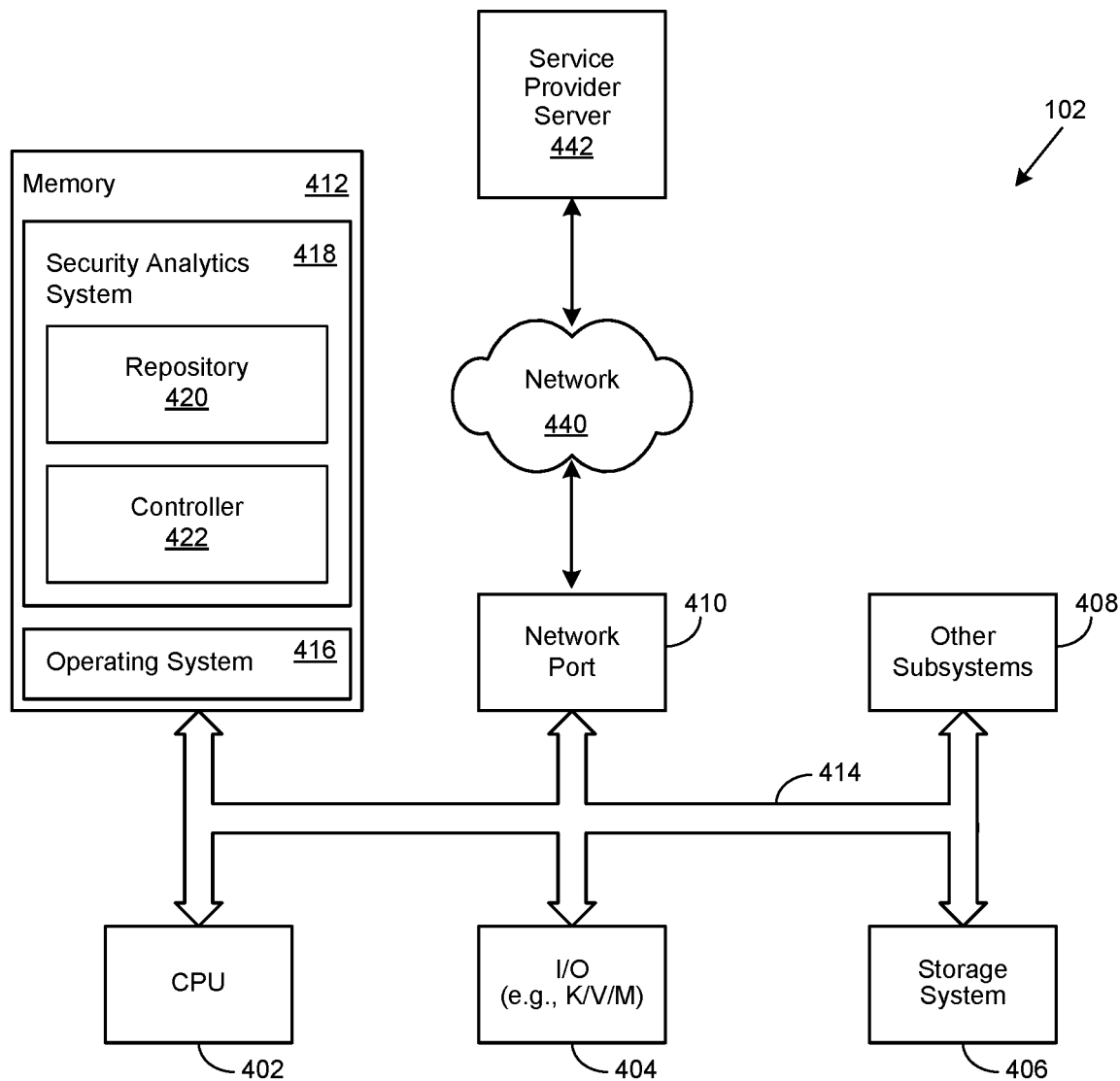
FIG. 4 is a block diagram of an information handling system that implements a computing platform for use in routing data loss prevention (DLP) events across different network levels.

FIG. 4 is a generalized illustration of an information handling system that implements a computing platform 102 for use in routing data loss prevention (DLP) events across different network levels. The computing platform 102 includes a processor (e.g., central processor unit or "CPU") 402, input/output (I/O) devices 404, such as a display, a keyboard, a mouse, and associated controllers, a storage system 406, and various other subsystems 408. In various embodiments, the computing platform 102 also includes network port 410 operable to connect to a network 440, which is likewise accessible by a service provider server 442. The computing platform 102 likewise includes system memory 412, which is interconnected to the foregoing via one or more buses 414. System memory 112 further includes operating system (OS) 416 and in various embodiments may also include a security analytics system 418. In one embodiment, the computing platform 102 is able to download the security analytics system 418 from the service provider server 442. In another embodiment, the security analytics system 418 is provided as a service from the service provider server 442.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to supports unified access management (UAM) that provides an identity management solution. UAM is used by enterprises to manage digital identities and provide secure access to users across multiple devices and applications (e.g., cloud and on-premise based devices and applications). UAM solutions provide a single platform from which information technology and other support entities manage access across a diverse set of users, devices, and applications. In certain implementations, data loss prevention (DLP) is part of UAM solutions, where DLP is a strategy that assures end users do not send sensitive or critical information outside a particular network (e.g., corporate network). DLP is also related to applications that assist in controlling what data can be transferred by end users.

In certain embodiments, the security analytics system 418 may include a repository 420 to store topic sets received from various DLP networks and a controller 422 that processes the topic sets received from various DLP networks.

Figure 5:
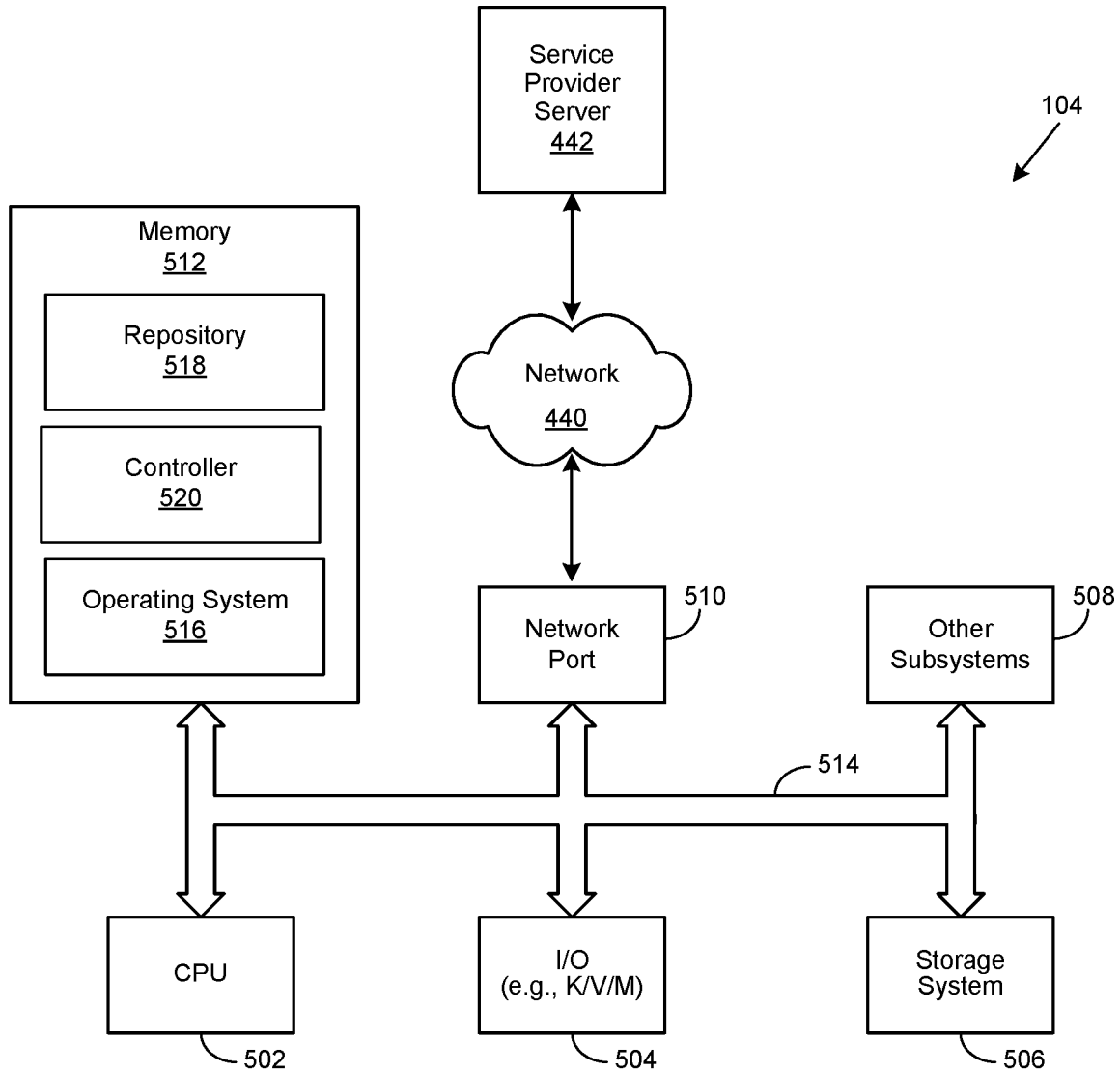
FIG. 5 is a block diagram of an information handling system that implements a transformation platform.

FIG. 5 is a generalized illustration of an information handling system that implements a transformation platform 104 for use in routing data loss prevention (DLP) events across different network levels. The transformation platform 104 includes a processor (e.g., central processor unit or "CPU") 502, input/output (I/O) devices 504, such as a display, a keyboard, a mouse, and associated controllers, a storage system 506, and various other subsystems 508. In various embodiments, the transformation platform 104 also includes network port 510 operable to connect to network 440, which is likewise accessible by service provider server 442. The transformation platform 104 likewise includes system memory 512, which is interconnected to the foregoing via one or more buses 514. System memory 512 further includes operating system (OS) 516 and in various embodiments includes a repository 518 and controller 520. The repository 518 performs the processes of repository component 110, and the controller 520 performs the processes of controller component 108. In one embodiment, the transformation platform 104 is able to download the repository 518 and controller 520 from the service provider server 442. In another embodiment, the repository 518 and controller 520 are provided as a service from the service provider server 442.

In various embodiments, the repository 518 and controller 520 as part of the transformation platform 104, performs routing data loss prevention (DLP) events across different network levels.

Figure 6:
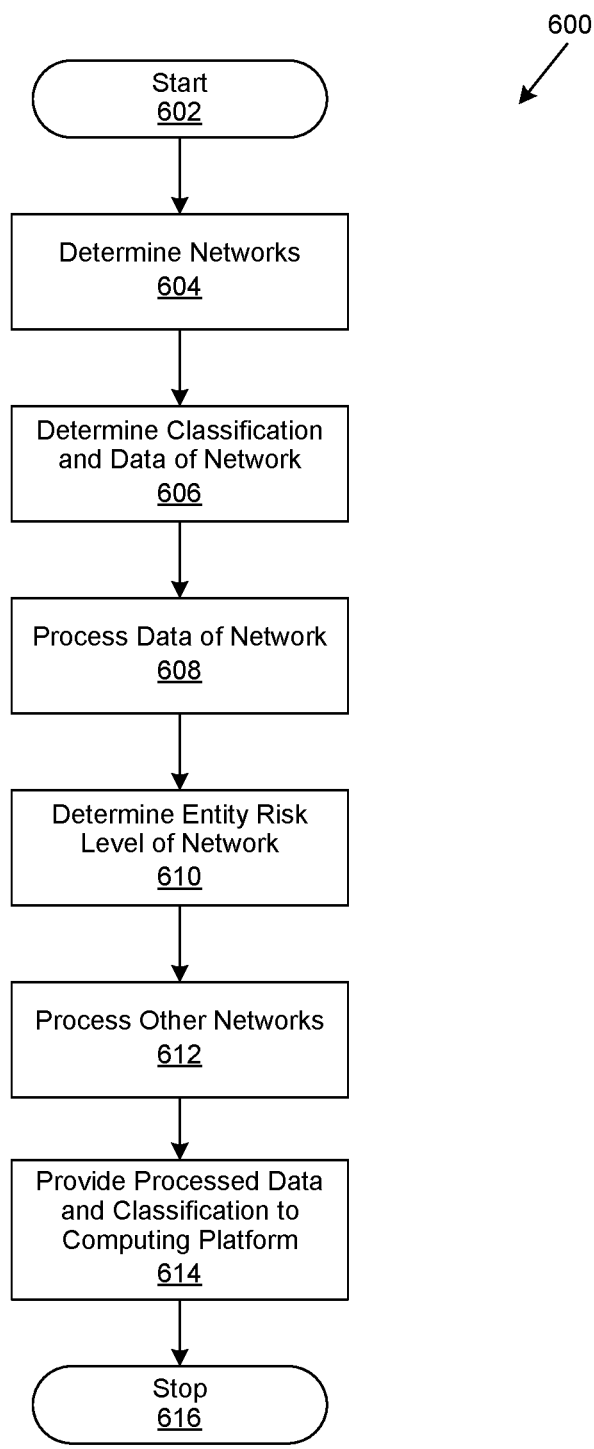
FIG. 6 is a generalized flowchart for routing data loss prevention (DLP) events across different network levels.

FIG. 6 is generalized process flow 600 for routing data loss prevention (DLP) events across different network levels. The order in which the process flow is described is not intended to be construed as a limitation, and any number of the described blocks can be combined in any order to implement the process flow. Additionally, individual blocks may be deleted from the process flow without departing from the spirit and scope of the subject matter described herein. Furthermore, the process flow may be implemented in any suitable hardware, software, firmware, or a combination thereof, without departing from the scope of the invention.

At block 602, the process 600 starts. The process can take place at the described transformation platform 104. At step 604, a determination is made as to how many networks that are to be processed. In certain implementations, the networks can have different classification levels and provide different data, including messages and certificates. At step 606, classification of and the data of a network is determined. In certain instances, the data is processed, and in certain instances, such as when data is a certificate the data is held and passed along to a computing platform for further processing. At step 608, data which is to be processed is processed. Such data can include topic sets which can further include an entity risk level of the network. At step 612, the entity risk level of the network is determined, and the processed entity risk level is returned to the network. At step 612, other networks are processed. In certain implementations, the processing is from lowest to highest classification level. In certain implementations, intermediately processed networks are passed through edge devices 106 and returned to the transformation platform 104. At step 614, after all networks are processed, processed tropic sets and held data (e.g., certificates) are passed to computing platform 102. At block 616, the process 600 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for routing data loss prevention (DLP) events across different network levels comprising:
   determining the number of DLP networks to process;
   determining classification of a DLP network and data to be received from the DLP networks;
   processing certain data that includes secure socket layer (SSL) certificates of the DLP networks, that include risk ratings that are pushed and stored to a repository network;
   providing the stored risk ratings of the DLP network to the other DLP networks;
   processing the remaining DLP networks; and
   passing all processed and held data to a computing platform for the other DLP networks to push and pull the processed and held data from.

2. The method of claim 1, wherein the routing is directed to unified access management.

3. The method of claim 1, wherein the data includes topic sets and certificates.

4. The method of claim 1, wherein held data are certificates which are processed by the computing platform.

5. The method of claim 1, wherein a repository holds data and passes the held data to a controller that processes the data.

6. The method of claim 1, wherein the computing platform is a functional behavior assessment (FBA) platform.

7. The method of claim 1, wherein intermediately processed networks are passed through an edge device.

8. A system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:
   determining the number of DLP networks to process;
   determining classification of a DLP network and data to be received from the DLP networks;
   processing certain data that includes secure socket layer (SSL) certificates of the DLP networks, that include risk ratings that are pushed and stored to a repository network;
   providing the stored risk ratings of the DLP network to the other DLP networks;
   processing the remaining DLP networks;
   and passing all processed and held data to a computing platform for the other DLP networks to push and pull the processed and held data from.

9. The system of claim 8, wherein the routing is directed to unified access management.

10. The system of claim 8, wherein the data includes topic sets and certificates.

11. The system of claim 8, wherein held data are certificates which are processed by the computing platform.

12. The system of claim 8, wherein a repository holds data and passes the held data to a controller that processes the data.

13. The system of claim 8, wherein the computing platform is a functional behavior assessment (FBA) platform.

14. The system of claim 8, wherein intermediately processed networks are passed through an edge device.

15. A non-transitory, computer-readable storage medium embodying computer program code, the computer program code comprising computer executable instructions configured for:
   determining the number of DLP networks to process;
   determining classification of a DLP network and data to be received from the DLP networks;
   processing certain data that includes secure socket layer (SSL) certificates of the DLP networks, that include risk ratings that are pushed and stored to a repository network;
   providing the stored risk ratings of the DLP network to the other DLP networks;
   processing the remaining DLP networks; and
   passing all processed and held data to a computing platform for the other DLP networks to push and pull the processed and held data from.

16. The non-transitory, computer-readable storage medium of claim 15, wherein the routing is directed to unified access management.

17. The non-transitory, computer-readable storage medium of claim 15, wherein the data includes topic sets and certificates.

18. The non-transitory, computer-readable storage medium of claim 15, wherein held data are certificates which are processed by the computing platform.

19. The non-transitory, computer-readable storage medium of claim 15, wherein a repository holds data and passes the held data to a controller that processes the data.

20. The non-transitory, computer-readable storage medium of claim 15, wherein the computing platform is a functional behavior assessment (FBA) platform.

* * * * *